United States Patent
Qiao et al.

(10) Patent No.: US 12,425,493 B2
(45) Date of Patent: Sep. 23, 2025

(54) CONFIGURING SERVICE REQUEST INTERFACE BASED ON PROCESSING TIME PREDICTION

(71) Applicant: Uber Technologies, Inc., San Francisco, CA (US)

(72) Inventors: Shenglan Qiao, San Francisco, CA (US); Amar Shibli, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/217,186

(22) Filed: Jun. 30, 2023

(65) Prior Publication Data

US 2024/0267438 A1   Aug. 8, 2024

Related U.S. Application Data

(60) Provisional application No. 63/443,611, filed on Feb. 6, 2023.

(51) Int. Cl.
*G06F 15/16* (2006.01)
*H04L 43/045* (2022.01)
*H04L 67/62* (2022.01)

(52) U.S. Cl.
CPC ............ *H04L 67/62* (2022.05); *H04L 43/045* (2013.01)

(58) Field of Classification Search
CPC .............................. H04L 67/62; H04L 43/045
See application file for complete search history.

(56) References Cited

U.S. PATENT DOCUMENTS

| | | | |
|---|---|---|---|
| 2018/0114286 A1* | 4/2018 | Prum | G06Q 20/202 |
| 2019/0057476 A1 | 2/2019 | Zhang | |
| 2020/0134767 A1 | 4/2020 | Zhang | |
| 2021/0303106 A1* | 9/2021 | Yang | G06F 3/0486 |
| 2022/0292414 A1* | 9/2022 | Demiralp | G06Q 10/047 |
| 2023/0072625 A1* | 3/2023 | Zhang | G06Q 50/40 |
| 2024/0267438 A1 | 8/2024 | Qiao | |

FOREIGN PATENT DOCUMENTS

| | | |
|---|---|---|
| CN | 110750709 | 2/2020 |
| WO | WO 2019/0128477 | 7/2019 |

OTHER PUBLICATIONS

ISR and Written Opinion mailed Feb. 5, 2024 in PCT/US2024/0014453.

* cited by examiner

*Primary Examiner* — Padma Mundur
(74) *Attorney, Agent, or Firm* — Mahamedi IP Law LLP

(57) ABSTRACT

A network computing system receives, over one or more networks, a service request from a requester device. The network computer system predicts a processing time interval, where the processing time extends from a time when the service request is received until a time when a service provider that is selected by the network computer system accepts an invitation to fulfill the service request. The network computer system transmits content data to the requester device, where the content data causes the requester device to display content that is based on the predicted processing time interval.

20 Claims, 5 Drawing Sheets

— CONFIGURING SERVICE REQUEST INTERFACE BASED ON PROCESSING TIME PREDICTION —

RELATED APPLICATIONS

This application claims the benefit of U.S. Provisional Application No. 63/443,611, filed Feb. 6, 2023; the aforementioned priority application being incorporated by reference in its entirety.

TECHNICAL FIELD

Examples pertain to a network computer system to configure a service request interface based on processing time prediction.

BACKGROUND

Numerous types of on-demand services exist. These services enable users to receive a type of service, typically through user-interaction with a service application that is executing on a mobile computing device. Examples of such on-demand services include (i) human transport services, where service requesters are provided transport by service providers; (ii) delivery services, where service requesters requests food or other items for delivery by service providers; and (iii) shipping services, where service providers ship items on behalf of service requesters. Due to the nature of on-demand services, expediency can often be a priority of service requesters. Furthermore, as service requests are not scheduled in advance, some uncertainty can exist with regards to a service provider being found to fulfill a service request.

On-demand services are typically supported by significant network computing resources. To handle a given service request, a network computing system may be deployed that employs an array of dedicated processes (e.g., microprocesses) to perform specific tasks. In context of transportation services, for example, separate processes can be deployed to perform each of receiving a service request, estimating completion times for requested services, selecting candidate service providers that can fulfill the service request, sending invitations to the candidate service providers, identifying a match between a service provider and service request, and communicating information about the matched service provider to the requester. In such context, user's that cancel a service request can have a disruptive and disproportionate impact on the efficiency of a network computing system, as numerous processes may have been deployed in anticipation of the requester being matched to a service provider that will fulfill the requester's service request.

DETAILED DESCRIPTION

Figure 1:
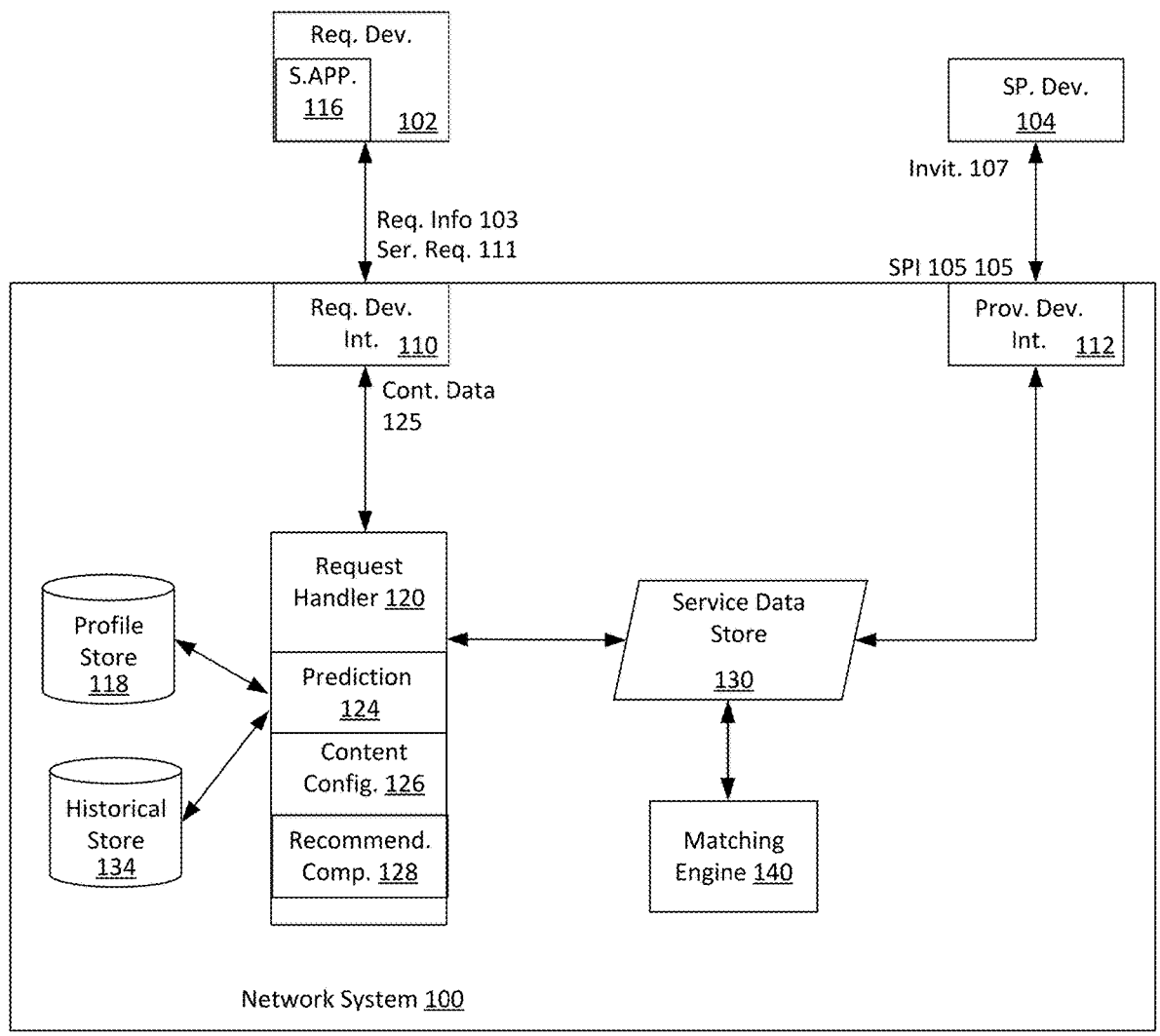
FIG. 1 illustrates a network system to configure a service request interface based on a processing time prediction, according to one or more embodiments.

In embodiments, a network computer system is configured to provide on-demand services for requesting users. The network computer system can receive, over one or more networks, a service request from a requester device. The network computer system predicts a processing time interval, where the processing time extends from a time when the service request is received until a time when a service provider that is selected by the network computer system accepts an invitation to provide the service request. The network computer system transmits content data to the requester device, where the content data causes the requester device to display content that is based on the predicted processing time interval.

In some embodiments, the content data can cause the requester device to display content that is indicative of the predicted processing time interval for the requester's service request. For example, the content displayed on the requester device can include or represent a countdown timer that counts down a duration that corresponds to the predicted processing time interval for the service request.

As an addition or variation, the content data can cause the requester device to select a user interface (or feature thereof) on which content is displayed, based on the predicted processing time interval. For example, the selected user interface can select to engage the requester with content that is configured or suited for the predicted processing time interval.

Among other technical advantages, embodiments as described reduce the frequency by which requesters cancel service requests. Embodiments recognize that the cancellation of service requests can often occur early on in a process where the service request is being matched to a service provider. At this time, the requester often has the most uncertainty about whether a service provider will be matched to his or her service request. By reducing the number of service request cancellations, embodiments enable greater efficiency in the user of resources used by a network computer system on which an on-demand service is provided.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver of a vehicle) that provides location-based services for requesters.

In examples, the processing time interval can reflect a time extending from when a service request is received to a time when a requested service is initiated (or about to be initiated) by a service provider. In context of transportation services, the time when a requested service is initiated can correspond to when a service provider is matched to a service request. In order to match a service provider to a service request, the network computing system may perform processes that include (i) determining available service providers that are candidates for fulfilling the service request, (ii) inviting the available service providers to fulfill the service request in accordance with a selection or communication protocol, and (iii) matching to a selected service provider who accepts an invitation to provide a service for the service request. When a service request is matched, it signifies that a suitable service provider has been selected for the service request, and further that service provider has committed to performing the tasks for fulfilling the service request. At this point, information about the matched service provider can be communicated to the service requester. Accordingly, in some examples, the processing time interval can correspond to a time extending from when a service request is received to a time when a selected service provider is matched to the service request.

While some examples as described relate to use of on-demand transportation system, embodiments are more generally applicable to other types of on-demand services where service requests are matched to service providers. Accordingly, examples may relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For the purpose of simplicity, in examples described, the service arrangement system can correspond to a transport arrangement system that arranges transport and/or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Network System

FIG. 1 illustrates a network computing system to configure a service request interface based on a processing time prediction, according to one or more embodiments. In examples, a network computing system 100 is described to provide an on-demand service (e.g., on-demand transportation service). The network computing system 100 can be implemented by, for example, a server or combination of servers. In variations, the network computing system 100 can include processes that execute on user devices, such that the network computing system 100 is distributed between, for example, server(s) and user computing devices (e.g., mobile devices carried by users to request and receive on-demand services).

In examples, the network computing system 100 includes a requester device interface 110, a provider device interface 112 a service request handler 120, a service data store 130, and a matching engine 140. The request handler 120 can further include processes represented by prediction component 124 and content configuration component 126. As described in greater detail, the prediction component 124 can predict processing time intervals for service requests, and the configuration component 126 can generate content data to configure the content of requesting devices based on the predicted processing time.

The network computing system 100 operates to match service requests 111 for a given geographic region with service providers. Processes represented by the requester device interface 110 communicate with the requester devices 102 to authenticate the user (e.g., in response to the requester opening the service application 116 on the requester device). The requester device interface 110 can receive requester information 103, communicated from requester devices 102 through user interaction with the service application 116. By way of example, the requester information 103 can be provided from requester devices 102 on which the requester has recently opened the service application 116 and/or has the service application 116 running in the background. In one or more examples, requester information can 103 include data corresponding to inputs provided on various user interfaces and/or selectable features on user interfaces of the service application. The requester information 103 can include the user's location, which can be determined from location-aware resources of the requester device 102. The requester device interface 110 can also receive a service request 111, communicated from the requester device 102 using the service application 116.

The request handler 120 can implement operations to manage the handling of the service request 111. In examples, the request handler 120 can interface with the service data store 130 to record the service request 111, initiate a matching process through the matching engine 140, and communicate responses and updates to the requester device 102 via the requester device interface 110. Each service request 111 that is recorded with the service data store 130 can include a set of service request attributes. The set of service request attributes include a requester user identifier, a requester's position information (e.g., current location), and/or one or more service locations (e.g., service start or pickup location, service end or destination location, etc.) specified in the requester's service request. In some variations, the service request attributes can also include a service type (e.g., type of vehicle), a service start time or a service end time (e.g., drop-off by a specific time). The request handler 120 can also determine attributes that are to be associated with the service request 111. For example, for transport type requests, the request handler 120 determines attributes such an estimated trip duration and/or distance for completing a service request of the requester. Further, the request handler 120 can communicate with the requester device 102 to update information about the service request with the service data store 130. Likewise, the request handler 120 can interface with the service data store 130 to update the requester with information about the service request 111.

The provider device interface 112 can include operations to manage interactions with service providers. The provider device interface 112 can record information about service provider devices 104 ("service provider information 105") with the service data store 130. For each service provider, service provider information 105 can include the service provider's user identifier, position information, and status. The service provider's status can indicate whether the service provider is available to fulfill a service request. The provider device interface 112 can also update information about the service provider. For example, the provider device interface 112 can receive position information for service providers during times when service providers are online and available (e.g., when service provider is not assigned to a service request). The provider device interface 112 can also update the service data store 130 based on input received from the service provider. For example, service providers can communicate through their respective provider devices 104 when they are on break or online awaiting service requests to fulfill. The provider device interface 112 can also include monitoring processes that monitor the service data store 130 to determine status information about service providers. For example, the information recorded with the service data store 130 can also indicate that a service provider can be online and waiting to be matched to a service request. As an addition or variation, the provider device interface 112 can monitor the service data store 130 to identify when for example, a service provider is nearing completion of fulfilling a service request. When a service provider is within a threshold time or distance from completing a service request, the provider device interface 112 can update the status of the service provider to be available. The provider device interface 112 can also access a service provider profile store to determine when, for example, the service provider is nearing their signoff time, after which they will be unavailable.

The requester device interface 110 can also record the requester information 103 with the service data store 130. Likewise, the provider device interface 112 can record the service provider information 105 with the service data store 130. In this way, the service data store 130 can include entries that associate the requester user identifier with a corresponding service request 111 (if the requester has made one), and/or the requester's current position information. Further, the service data store 130 can identify attributes of each service request 111, such as the respective service start location and the service end location. For personal transport service requests, the service data store 130 can include attributes that identify an expected trip time or trip length, based on attributes such as the service start and end locations. The service data store 130 can also record service provider information 105, including service provider identifiers, service provider position information and status (e.g., available or unavailable).

The service data store 130 can also link each service provider with a corresponding profile of a profile store 118. Each service provider identified by service data store 130 can be linked to a type of service that individual service providers provide. The service type can further be associated with different attributes that can affect the desirability or cost of the service provided by the particular vehicle. For example, the service type can reflect the type of vehicle (e.g., luxury, green, large capacity (e.g., SUV)) the service provider operates, amenities which the vehicle of the service provider offers, the experience level (or trust level) of the service provider, and other attributes. Further, the profile of the individual providers can reflect their propensity or preference for accepting invitations to provide services for service requests, based on factors such as trip length, and estimated fee (or compensation) for fulfilling the service request. Still further, the profile of individual service providers can also reflect the propensity of the service provider to accept an invitation to provide a service for a service request when a boost payment is offered. For example, a service requester can boost his or her service request by offering a surcharge payment to any service provider who accepts the invitation to fulfill the service request. In this regard, the boost payment can be used to facilitate the service requester in the likelihood that their service request will be more quickly accepted by a service provider, so that the service requester can reach their destination by a desired time.

Matching Process

In examples, when a service request 111 is received, the matching engine 140 initiates a matching process to match the open service requests 111 to one or more service providers. The matching process can include multiple subprocesses, including, for example, subprocesses for (i) identifying a candidate set of service providers, (ii) communicating an invitation 107 to fulfill a service request 111 to one or more of service providers of the candidate set, and (iii) matching a service request 111 to a selected service provider that accepts the service invitation 107. The subprocesses performed by the matching engine 140 are described in greater detail below.

The candidate set of service providers can be identified from the service data store 130, where service providers of the candidate set are selected based at least in part on their respective position information and availability status. In determining a service provider for a candidate set, the current position of an available service providers can be compared to the service start location of the open service request. If the available service provider is within a threshold distance of and/or estimated time of travel from (e.g., as measured by trip time, Haversine distance, etc.) the service start location, that service provider may be selected for the candidate set.

Further in examples, the matching engine 140 communicates (through the service data store 130 and/or provider device interface 112) invitations 107 to individual service providers of the candidate set. Each service provider that receives an invitation 107 can have an allotted time interval to respond to the invitation. Depending on implementation, invitations may be sent out in series, concurrently, or through some distribution process. The order in which service providers may receive invitations can also vary, based on implementation.

In examples, once a service provider of the candidate set accepts an invitation 107 to fulfill a service request, the service request may be deemed as matched. Once a service request is matched to a service provider, processes represented by the request handler 120 communicate with the corresponding requester device 102 (via the requester device interface 110) to provide information about the matched service provider. The information about the matched service provider can include, for example, the service provider's name, the type of vehicle, the license plate number, and the service provider's experience level. The request handler 120 can further communicate updates to the requester device 102. The updates may include content (e.g., visual content, map content) that indicates the progress of the service provider in initiating performance to fulfill the requester's service request. For example, the service application 116 can run on the requester device 102 to receive progress information, reflecting the service provider driving his vehicle towards the service start position.

Time-to-Match

The processing time interval can include a duration of the matching engine 140 takes to match an open service requests 111 with a selected service provider that accepts the invitation 107 to fulfill the service request. In such examples, the processing time interval can alternatively be referred to as "time-to-match" for the service request. For a given service request, the processing time interval can vary from seconds to minutes, depending on a variety of factors, including attributes of the service request and/or service conditions. Attributes of the service request 111 can include the service location(s), trip time and/or trip distance (or fee that may be earned from fulfilling service request), or profile information about the requester (e.g., service requester rating) may impact the desirability of the service request, which in turn can affect the processing time interval. Service conditions that can affect the processing time interval can include a number of open transport requests in a vicinity of the service requester or service start location, the number of available service providers in the vicinity, the product or vehicle type requested by a user, and other conditions which can impact the number of available service providers or open service requests in the interval when the service request is being matched to a service provider.

By way of example, the service applications 116 operate on the requester devices 102 to generate interfaces which allows for requesters to make transport requests and receive information about service providers that are to fulfill their service requests. A requester can launch the service application 116 to make a service request (e.g., personal transport service request). In making a service request, the user can specify one or more service locations, such as a service end location (or a destination), a service start location (e.g., a pickup location (e.g., the current location or inputted location or address) and a service or vehicle type. Under conventional approaches, once the user submits the service request, the service application 116 can display an interstitial interface that indicates to the user that a service provider is being located for their service requests. Once the service provider is located, the service application can display information about the service provider (e.g., name, rating, experience, type of vehicle, license plate, etc.). Further, the service application 116 can display information about the progress of the service provider in traveling towards the pickup location.

Prior to the requester being informed that a service provider has been selected and/or is progressing or driving to the service start location, the requester may be uncertain as to whether the service request will be matched. The longer the time-to-match interval is, the more dissuaded the requester may become that their service request will be matched. Further, the service requester may misinterpret a duration of the time-to-match interval. For example, a requester may be familiar with a time-to-match interval that is relatively short because the requester typically makes service requests from a busy region where many service providers are available. But when the requester makes a service request from a different region with fewer service providers, the average time-to-match interval may be disproportionately longer, and the requester may incorrectly interpret that additional time as there being no service providers available.

Examples recognize that requesters typically have no way of knowing all of the different factors which may vary the processing time interval for service requests. Further, the requester's experience with an interstitial interface can appear longer than it actually is because requesters may stare at their respective devices 102 when waiting for information about the service provider. This experience can dissuade users from continuing to wait, and cause the user to cancel the service request. Because numerous steps are involved in locating a service provider (e.g., locating candidate service providers, communicating with service providers, etc.), the occurrence of cancellations are disruptive to the operations of the network system, and also reduce the efficiency of the network computing system 100.

Request Handler

In examples, the request handler 120 can include processes that use information of the service data store 130 to (i) predict a processing time interval, corresponding to a duration between when the service request is made by the requester and information about a matching service provider is communicated to the corresponding requester device 102; and (ii) generate content data 125 for transmission to the requester device, in order to cause the requester device 102 to display content that is based on the predicted processing time interval. Further, in some examples, the request handler 120 can configure a content interface provided through the service application 116 running on the requester device 102, where the content interface is to keep the requester engaged, so as to lessen the experience of the time-to-match interval.

In examples, the request handler 120 includes a prediction component 124 that predicts the time-to-match interval for a given service request 111. The request handler 120 can also include a content configuration component 126 that generates content data for transmission to the requester device 102, where the transmitted content data 125 causes the corresponding service application 116 to display content that is based on the predicted processing time interval. In some examples, the displayed content includes or indicates a timer that reflects the predicted processing time interval for the service request. As described in more detail, the prediction component 124 can predict a time-to-match interval for a service request based on (i) attributes of the service request, (ii) service conditions, including factors that affect the availability of service providers, and/or (iii) a tendency or action by one or more service providers that are otherwise available to fulfill the service request. Once the service request 111 is received, the matching engine 140 initiates a matching process as described with examples. At the same time, the prediction component 124 can predict the processing time interval for matching the service request 111 to an available service provider.

Predicted Processing Time Interval for a Service Request

The prediction component 124 can predict the processing time interval for newly received (or open) service requests, where the predicted processing time interval extends from a time when the service request is received until a time when a service provider that is selected by the network computer system 100 accepts an invitation 107 to fulfill the service request. The predicted processing time interval can coincide with a specific value (e.g., specific number of seconds, such as 35 seconds, 1 minute, etc.), a range of values (e.g., between 40-65 seconds), or a threshold value (e.g., less than two minutes). Further, the determination can be an approximation and/or subject to rounding (e.g., round up to nearest 10 second, 30 seconds, etc.). Further, the approximation can incorporate margin or error or variance based on, for example, a standard deviation.

In predicting the processing time interval for a given service request 111, the prediction component 124 can utilize aggregate historical information to determine attributes of individual service requests that can affect the processing time interval for a service request. Specifically, the prediction component 124 can identify attributes of service requests which make individual service requests desirable to service providers. If the service request is more desirable, the processing time interval for the service request can be less, as more desirable service requests are accepted more quickly by service providers. In some examples, the desirability metric for a service request can be a learned metric that is determined from the historical data store 134. For example, the historical data store 134 can record information of the service data store 130 from past time intervals. The historical information can be analyzed to determine the propensity of individual service providers to accept or decline invitations 107 for service requests, given particular attributes of service requests such as service end location, expected trip time or duration, fare amount (or fee that service provider can earn in fulfilling transport request) and/or other attributes of the service request 111. Still further, the historical data store 134 can be analyzed in aggregate to determine a general propensity of service providers with respect to characteristics of service requests that are deemed desirable. The determinations can be determined in context of service types, location or region, day/time and other factors. Further, the determination of desirability metrics for individual service providers or in aggregate can also be determined based on learned models, where the models are trained based on the historical information of the historical data store 134.

The prediction component 124 can also employ logic and/or predictive models to determine the processing time interval, or the influence service request attributes have on the processing time interval for individual service requests. In this way, the prediction component 124 can associate a desirability metric with attributes and characteristics of service requests. In some examples, the prediction component 124 can identify impactful service request attributes to include the destination location, the trip time, the expected fare or compensation to the service provider, and/or profile information of the service requester. For example, if the service request specifies a destination that has a high propensity for enabling the service provider to find a next service request to fulfill, the service request may be deemed to be more desirable. If, on the other hand, the destination location is a relatively short distance in a direction that has less need for transport services, the service request may be deemed less desirable. Likewise, if the service request takes the service provider to a location that requires a lengthy return trip with likely no additional service requests, the service request may be more undesirable. More specific correlations between service request attributes and desirability of the service request to service providers can be determined by the prediction component 124 through analysis of the historical data store. Further, the degree to which the attribute impacts the processing time can be modeled for identified attributes. Additionally, the prediction component 124 can determine service attributes that are impactful (or potentially impactful), as well as the predicted impact of such attributes on the processing time interval. The determinations can also be made specific to geographic regions, service types, time/day and other context.

In some examples, the desirability of the service request 111 can be a learned metric that is determined from the historical data store 134. For example, the historical data store 134 can record information of the service data store 130 from past time intervals. The historical information can be analyzed to determine the propensity of service providers to accept or decline invitations 107 to fulfill service requests, given particular attributes of service requests such as service end location, expected trip time or duration and/or other attributes of the service request 111. Still further, the desirability of the service request can include the fee which the service provider may earn for fulfilling the requested service.

As an addition or variation, the prediction component 124 can also develop logic or predictive models from the historical data store to correlate aspects of the requester's profile with desirability and/or processing time for the service request. For individual service requests 111, the prediction component 124 can access the requester's profile to determine whether profile information about the requester impacts the desirability of the requester's service request. In examples, the rating (feedback from other service providers) can impact the desirability of the requester's service request. For example, if the requester has a relative high rating based on feedback from other service providers, then service requests from that requester may be weighted to be more desirable, because the high rating can indicate that the requester tips. The prediction component 124 can access the requester's profile from a profile data store 118 to determine whether attributes of the requester can affect the desirability of the service request.

Still further, in some examples, the prediction component 124 can predict the processing time interval based on service conditions at a time and location that is relevant to the service request. The service conditions can be based on (i)

a number of available service providers that are within a threshold vicinity of the service start location, and (ii) a number of open service requests that can be matched to the available service providers. The determination of the service conditions can be made specific to a time interval and area that is relevant to the service request. The relevant time interval can include a threshold time interval from when the service request is received, corresponding to, for example, the time required for the requester to be matched to a service provider and have the service provider pickup the requester. In some examples, the relevant time can also include an estimated trip time to fulfill the service request. The time intervals can filter the list of available service providers in order to determine the candidate set of service providers. For example, service providers who are outside of a threshold distance such that their arrival to a service start location exceeds a threshold time interval, or service providers who are scheduled to signoff before or near the time when the service request is to be completed, may be excluded as candidates for the service request. The relevant area can include a threshold distance that defines an area that is deemed to be in the vicinity of the service start location. The threshold distance for defining the relevant area for a service request can be based on, for example, a Haversine distance or travel distance. The relevant area can also coincide or be based on the threshold time interval, where for example, service providers that are available within the vicinity of the service request can be deemed as suitable candidates for the service request.

The prediction component 124 can access the service data store 130 to determine a number of available service providers for a service request. The determination of the number of available service providers can be specific to a predetermined vicinity of the service start location. In some variations, the number of service providers can include service providers that are expected to complete an existing service request at a destination that is within the vicinity of the service start location, within a given time interval (e.g., one minute). Still further, the number of available service providers can include service providers that are off-line, but expected to come online within the relevant time interval. For example, the service data store 130 can identify service providers that are on break or otherwise temporarily unavailable, but within the vicinity of the service start location and expected to come online within the relevant time interval. As still another variation, the number of available service providers can include a predictive element, that's based on historical information. For example, the prediction component 124 can utilize historical information from the historical information store 134 to determine a frequency by which service providers are expected to go online and become available in the vicinity of the service start location during the relevant time interval. In determining the frequency of service providers going online, the prediction component 124 can develop a predictive model that is specific to the relevant area, based on historical information and context (e.g., time of day, day of week, month of year, weather, etc.).

The prediction component 124 can also access the service data store 130 to determine a number of service requests that are open in the vicinity of the service start location. Additionally, the prediction component 124 can access the service data store 130 to determine a number of requester devices that are present in the vicinity of the service start location but which have yet to transmit a service request. The number of such requester devices can be indicative of a number of service requests that may be received during the relevant time period, which in turn can affect the pool of available service providers.

As an addition or variation, the prediction component 124 can predict the time-to-match for the given service request based at least in part on an expected response from individual service providers that are available for fulfilling the service request. The expected response can reflect a propensity or likelihood that an available service provider will decline the service request. In examples, the expected response can be represented as a probability value, or other metric that reflects a propensity or likelihood that the identified service provider will accept or decline an invitation 107 to provide service for the service request. In some variations, the probability value or metric can also reflect a propensity or likelihood that the identified service provider will decline the service request by not responding within an invitation response time, where the invitation response time corresponds to a time period allotted for a service provider to accept an invitation 107 to fulfill a service request. The latter determination can impact the time-to-match interval, particularly in cases where only one service provider at a time receives an invitation 107 for service requests. When a service provider is nonresponsive to an invitation to fulfill a service request, the nonresponse responses can add an invitation response time (e.g., 15 seconds) to the time-to-match interval.

In examples, the prediction component 124 can make a determination of the service provider's expected response to a service invitation 107 based on historical information associated with the service provider. The prediction component 124 can determine the expected response from a service provider to a current service request by analyzing prior invitation responses of the service provider. The historical information of historical information store 134 can include recent invitation responses from candidate or selected service provider(s). For example, if a candidate or selected service provider is online, but has declined to accept one or more service invitations immediately prior to the most recent service requests, then the prediction component 124 may determine the value of the expected response to reflect a higher probability (e.g., as compared to an average or default value) of the service provider declining an invitation 107 for the current service request. This determination can increase the predicted processing time interval for the service request, as a longer time may be anticipated to find a service provider that will accept the service invitation 107.

The prediction component 124 can also factor parameters relating to the desirability of the service request when determining the expected response from a particular service provider that is available to fulfill a given service request. The prediction component 124 can access the profile store to determine whether the service provider has preferences with respect to timing or geography that are not consistent with the attributes of the service request. If such preferences exist, the prediction component 124 can determine the value of the expected response to reflect a higher probability of the service provider the declining the service invitation 107. In such case, the predicted processing time interval may be given a greater value to account for the greater difficulty in finding a service provider that will accept the invitation 107 for the service request. Still further, the profile store 118 can include, for example, a history of the service providers responses to invitations 107. Based on such historical responses, the prediction component 124 can determine a propensity of the service provider to decline or accept invitations 107 to fulfill service requests based on particular attributes, such as the value or award associated with a service request.

In some examples, the prediction component 124 can develop a model that predicts the processing time interval (e.g., time-to-match interval) based on multiple different model parameters, including parameters that reflect a desirability of the service request, an availability of service providers, and an expected response from one or more available service providers. By way of example, the model parameters can include one or more parametric values that represent (i) one or more attributes of the service request, such as the service end location, the expected trip time or distance, the service start location, the value or award associated with fulfilling the service request, and/or the rating of the requester; (ii) a number of open service requests in the vicinity of the service start location; (iii) a number of requester devices 102 that have the service application 116 running but have yet to make a service request; (iv) the number of service providers that are currently available in the vicinity of the service start location; (v) the number of service providers that are likely or potentially available during the relevant time period and in the vicinity of the service start location; and/or (vi) the expected invitation response (or probability value) of individual service providers that are deemed available for the service request. The model parameters can be weighted based on learning processes that monitor and observe historical information obtained from the service data store 130 and/or historical information store 134.

In this way, the prediction component 124 can implement models that are tuned, or otherwise configured for the location and time interval that is relevant to the given service request. For example, the parametric values used by the model(s) of the prediction component 124 can be weighted based on historical information that is specific to the relevant area and time interval for the service request. In turn, the predictive models can be used to predict the processing time for a service request, based at least in part on parametric values as described.

Content Configuration

The content configuration component 126 represent processes that communicate content data 125 to the requester device 102, via the requester device interface 110. The content data 125 can include data that causes the requester device 102 to display content that is indicative of or otherwise based on the predicted processing time interval for the service request. In examples, the content data 125 can correspond to a value representing the predicted processing time interval, and the service application 116 processes the content data to generate a dynamic feature that reflects or is otherwise based on the value for the predicted processing time interval. In variations the content data 125 can include logic for enabling the service application 116 to generate the dynamic feature.

In examples, the content data 125 is transmitted to the requester device 102 in response to the requester device submitting a service request. The service application 116 can use the content data 125 to display content on the service application during a time interval that extends from the time the service request is received until the time a selected service provider accepts an invitation 107 for the service request. In an example, the content data 125 can include data to enable the service application to generate a countdown timer that counts down from a value that coincides or is based on the predicted processing interval, as determined by the prediction component 124. The countdown timer can be in the form of a digital timer, such as a digital timer that displays numerically in seconds the amount of time remaining until the service request is expected to be matched to a service provider. In variations, the countdown timer can be displayed through alternative graphic and or animated forms, and further in combination with other types of content which may be selected based on the processing time interval. By way of example, the content data 125 can be another form of dynamic graphic, such as animated content depicting an hour glass timer (where the amount of sand remaining in a portion of the hour glass indicates the remaining amount of the processing time interval), falling ball (where the distance until the ball reaches the ground is based on the remaining amount of the processing time interval), or traced circle or shape (where the amount of shape remaining to be traced reflects the remaining amount of the processing time interval).

As an addition or variation, type and/or configuration of a content interface in the requesting device can be determined by content data 125, generated by the content configuration component 126. In some examples, the content configuration component 126 selects a content interface for the requester device 102. The network computing system 100 can select one or more content interfaces for a requester, where the selection is made from a collection of multiple types of content interfaces. The types of content interfaces can include one or more content interfaces that display the predicted processing interval in a graphic form, such as in the form of a visualization of a countdown timer. Additionally, the types of content interfaces that can be displayed to the user based on the predicted processing time interval can include one or more interfaces that are configured to engage the user. For example, a content interface can be selected to engage the user for amusement. By way of illustration, a selected user interface can provide a trivia game, arcade game or puzzle for the user to solve. Such types of user interface can prompt the requester to engage with the requester device 102 in a manner that is amusing or engaging to the requester.

The content configuration component 126 can also generate the content data 125 to configure the selected user interface based on the predicted processing time interval. For example, the predicted processing time interval can set an objective and/or duration of the engagement. As illustrative examples, the user can be prompted to solve a number of puzzles, where the number of puzzles are based on the predicted processing interval. Still further, the determination of whether the user is to be provided an engagement interface can be based at least in part on the predicted processing time interval exceeding a threshold value (e.g., 45 seconds).

Updating

In examples, once the prediction component 124 predicts the processing time interval for a service request, the prediction component 124 monitors the subsequent matching process to determine whether the matching process is progressing as predicted. In examples, each sub-process of the matching process is monitored to determine whether a time of completion of that sub-process matches a predicted time of completion. If the difference between the predicted time and the completed time exceeds a threshold, then the prediction component 124 can generate an updated to the predicted processing time interval. The content configuration component 126 can transmit content data 125 to update the content data provided on the requester device 102. For example, a countdown timer that is provided on the requester device can be reset to a new value. Alternatively, an engagement panel that is selected for the user can be adjusted to reflect the updated predicted time interval.

Further, in some examples, the prediction component 124 can monitor the matching process for the service request to detect the occurrence of events which may represent delays or quickening to the predicted processing time interval. In examples, such events may correspond to, for example, when an unexpected number of candidate service providers decline the service request invitation 107. In such examples, the content configuration component 126 can communicate a change to the predicted processing time interval, along with an indicator of the reasons for the change (e.g., multiple service providers declined the service request invitation).

Action Recommendation

In examples, the network system 100 implements processes, represented by recommendation component 128, to recommend one or more actions for the requester to take to reduce the processing time interval of an open service request. The recommendation component 128 can recommend the one or more actions in response to, for example, (i) an ongoing processing time interval for an open transport request exceeding the predicted processing time interval; (ii) one or more service providers declining to accept an invitation 107 to fulfill the service request; (iii) fewer service providers being available than expected; (iv) profile information of specific service providers that are otherwise available for the service request, where the profile information indicates that the service request is likely to be undesirable to the service provider (e.g., profile information indicates service provider typically declines service requests of the same or greater fare value); (iv) another service or option becoming available while the processing time interval is going, and/or (v) other events or occurrences that are indicative of the processing time interval for the service request taking longer than expected or necessary. In response to the recommendation component 128 determining an alternative or additional set of actions with respect to an open service request, the content configuration component 126 generates content data 125 to provide recommendations that are based on the determined set of actions to the requester device 102.

In examples, the recommendation component 128 can determine an alternative or additional set of actions to include an action where the requester modifies the open service request or resubmits the service request with one or more modifications that are intended to make the service request more desirable to service providers. The modifications can change the service parameters of the transport request to make the service request more desirable to available service providers. For example, the recommendation component 128 can determine recommended actions to include changing a service location of the service request (e.g., pickup or drop-off location), and/or adding a boost payment or surcharge (e.g., to change the fare value for the service provider).

The recommendation component 128 can determine one or more modifications to an open transport request based on historical information about the service provider. Thus, for example, the recommendation component 128 can determine a recommended action of the requester submitting a boost payment with the service request. In such examples, an amount of the boost payment can be based on profile information associated with one or more available service providers. For example, the service provider's profile information can indicate recent instances when the service provider has accepted an invitation 107 for a service request with a boost payment, has accepted invitations 107 for service requests with boost payments of a particular value, and/or has accepted invitations 107 for service requests where the fares have been of a particular value or greater.

As an addition or alternative, the recommendation component 128 can determine the modifications based on historical information that aggregates the behavior of service providers. For example, the recommendation component 128 can determine an amount of the boost payment based on aggregate information determined from service providers, indicating thresholds for boost payment (or overall fare value) where the transport request is likely to become desirable.

Further, the recommendation component 128 can implement one or more models that predict the desirability of service requests to service providers. The recommendation component 128 can utilize the models to determine recommended actions the user can take to make the service request more desirable to available service providers.

As an addition or alternative, the recommendation component 128 can determine a recommended action to modify or resubmit the service request 111 to specify an alternative type of service (e.g., different type of service vehicle, singular versus multi-person transport, etc.). The recommendation component 128 can identify the alternative type of product/service based on, for example, availability of service providers who offer the alternative product/service and the desirability of the service request to service providers who offer the alternative service or product. Thus, for example, if the service request initially specified a singular transport service using an economy class vehicle, the recommendation component 128 can recommend an alternative vehicle type (e.g., luxury sedan), based on the availability of the alternative vehicle type. Given the higher fare amount associated with an upgrade in the transport request, the change in service type can also make the service request 111 more attractive. Conversely, if the recommended service type is a downgrade (e.g., economy class vehicle rather than luxury vehicle), the service request may be available to a larger number of service providers.

Still further, in variations, the recommendation component 128 can suggest or recommend an action where the service request 111 of the user is fielded to multiple service providers who collectively provide multiple types of services. Thus, the recommended action can provide for the service requester to field a service request to service providers who operate, for example, different classes of vehicles, as well as service providers who offer pooled transport and singular transport. In such case, an invitation 107 for the service request 111 can be accepted by any service provider, regardless of a particular service type provided by the service provider.

In examples, the content configuration component 126 can update the content data 125 based on determined action(s) of the recommendation component 128. The configuration component 126 can generate the content data 125 to indicate, for example, one or more modifications the service requester can make to the service request, such as (i) identifying a boost payment the service requester can make, including indicating recommended amount(s) for the boost payment; (ii) changing a service location of the service request (e.g., the content may suggest that the user walk to a different pickup location to better the desirability of their service request); and/or (iii) changing the type of service requested (e.g., upgrading the service type), and including information for enabling the requester to evaluate the alternative recommended service type (e.g., fare value for alternative service type, estimated processing time interval and/or estimate time of arrival for the requester to reach their destination, etc.). The content data 125 can be generated to be interactive, in order to enable the requester to make a selection to perform the recommended action.

In some examples, once the service requester selects to modify their service request or otherwise perform the recommended action, the request handler 120 can initiate the prediction component 124 to determine a new or supplemental processing time interval. The new or supplemental processing time interval can reflect a predicted duration until the modified service request is matched to an available service provider.

Methodology

Figure 2A:
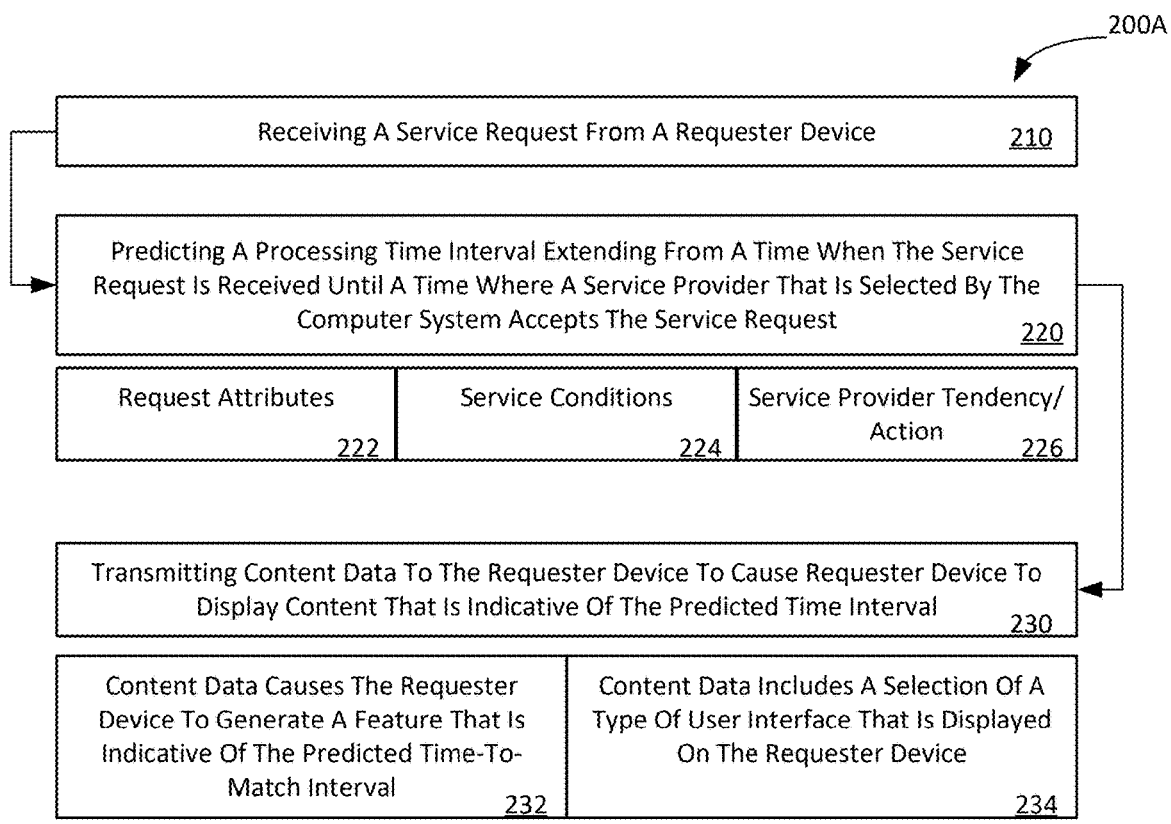
FIG. 2A illustrates an example method for configuring a service request interface based on a processing time prediction, according to one or more embodiments.
Figure 2B:
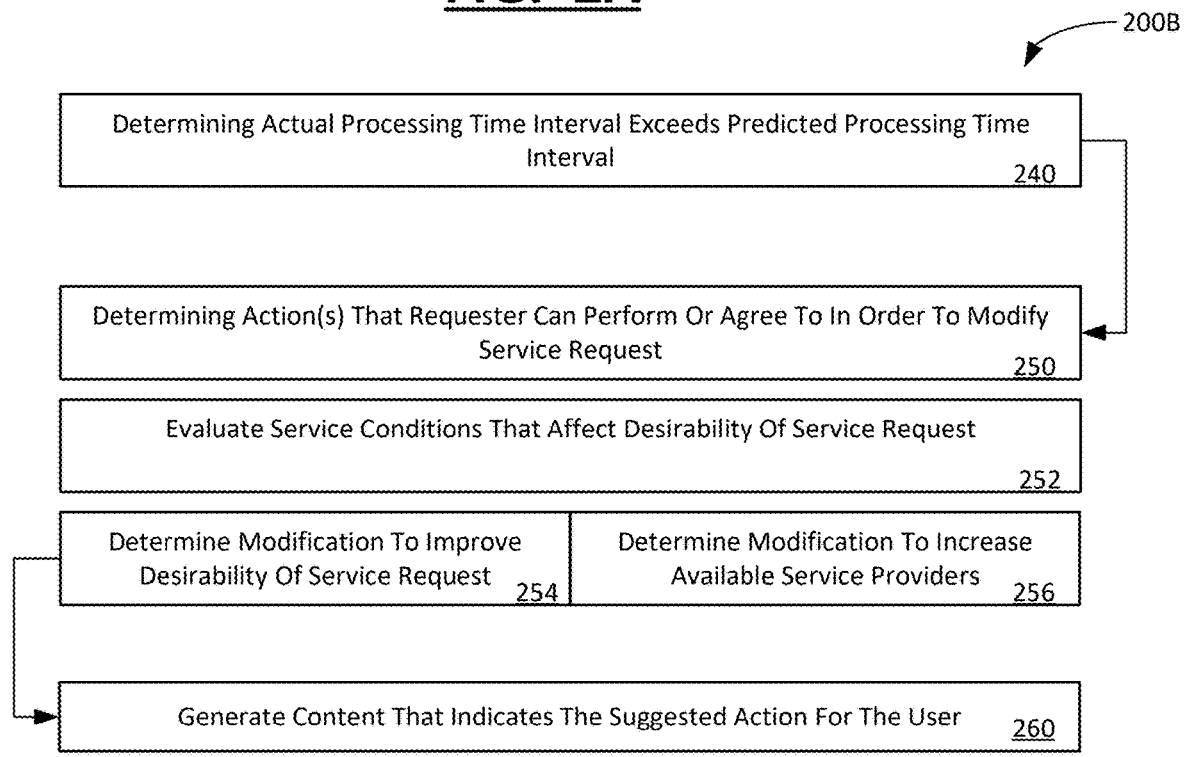
FIG. 2B illustrates an example method for recommending a set of actions for the requester to improve the processing time interval, according to one or more embodiments.

FIG. 2A illustrates an example method for configuring a service request interface based on a processing time prediction, according to one or more embodiments. FIG. 2B illustrates an example method for recommending a set of actions for the requester to improve the processing time interval, according to one or more embodiments. Example methods, 200A, 200B, such as described with FIG. 2A and FIG. 2B, can be implemented using elements described with FIG. 1. Accordingly, in describing example methods 200A, 200B, reference may be made to elements of FIG. 1 for purpose of illustrating a suitable component for performing a step or sub-step being described.

With reference to FIG. 2A, in step 210, the network computing system 100 receives the service request from a requester device. The network computing system 100 determines a set of attributes associated with the service request. The set of attributes can include one or more of service start location, a service destination, an estimated trip distance, an estimated trip time, a fee or award value associated with fulfilling the service request, and a service time (e.g., a time by which the service request should be fulfilled, based on the fee or award value associated with the service request or a preference of the user). In examples, the set of attributes can also include information about the requester. For example, the network computing system 100 may use requester profile information, obtained from profile store 118, to determine a service requester's rating, where the rating reflects feedback from other service providers who have provided service to the particular requester.

In step 220, the network computing system 100 predicts a processing time interval for the service request, where the processing time interval extends from a time when the service request is received to a time when a selected service provider accepts an invitation for the service request. The network computing system 100 can predict the processing time interval in response to the requester device transmitting a service request. Thus, network computing system 100 can predict the processing time interval before the matching process is initiated, or alternatively, while the matching process is ongoing.

In step 222, the network computing system 100 predicts the processing time interval based at least in part on one or more of the attributes that are associated with the service request.

As an addition or variation, in step 224, the network computing system 100 predicts the processing time interval based at least in part on one or more service conditions that are present, or expected to be present, for a time interval and geographic area that is relevant to the service request. Such service conditions can include, for example, (i) a number of open service requests in the vicinity of the service start location; (ii) a number of requester devices 102 that have the service application 116 running but have yet to make a service request; (iii) the number of service providers that are currently available; and (iv) the number of service providers that are likely or potentially available during the relevant time period.

As an addition or variation, in step 226, the network computing system 100 predicts the processing time interval based at least in part on expected response from individual service providers that are otherwise available to be matched to the service request. The expected responses can be made based on historical information that is specific to the available service providers. The historical information can determine, for example, whether the particular service providers have declined one or more service requests invitations in a recent prior time interval (e.g., immediately prior time interval). As an addition or variation, the historical information can determine, for example, whether the service requester has a propensity of declining service request invitations for a specific attribute that is shared with the current service request (e.g., service start or end location, trip time or distance, service value or award, etc.).

In step 230, the network computing system 100 transmits content data to the requester device, to cause the requester device to display content that is indicative of the predicted processing time interval. In step 232, the network computing system 100 transmits the content data 125 to cause the requester device to generate a feature that is indicative of the predicted processing time interval. The generated feature can be dynamic in that it can indicate a remaining processing time interval value that is continuously updated based on the passage of time and/or other events (e.g., available service provider(s) decline invitations for the service request). In some examples, the content data 125 causes the requester device 102 to generate a countdown timer. The countdown timer can be rendered in alphanumeric form, or displayed in graphic form.

As an addition or alternative, in step 234, the content data 125 transmitted by the network computing system 100 includes a selection of a type of user interface that is to be displayed on the requester device 102. The network computing system 100 can select a user interface that is to be displayed on the requester device 102 based on factors such as the predicted processing time interval, profile information of the requester and/or other factors. The types of user interfaces that can be selected include a set of user-interfaces which include or graphically represent a countdown timer that is based on the predicted processing time interval. The types of user interfaces that can be selected can also include one or more types of engagement content, where the user is prompted to engage with the requester device. Such types of user interfaces can, for example, enable the user to play a play game (e.g., trivia pursuit, arcade game), solve a puzzle (e.g., crossword or word puzzle, etc.) or perform another type of activity. In some examples, the selected user interface can also be configured based on the predicted processing interval. For example, if the predicted processing time interval is two minutes, the user interface that is displayed to the user can prompt them to complete a challenge within two minutes, or based on the determination of the predicted processing time interval being two minutes.

With reference to FIG. 2B, network computing system 100 determines in step 240 that the actual processing time interval for matching a service request of the requester is greater than the predicted processing time interval. For example, the network computing system 100 can detect that the service request remains open once the predicted processing time interval expires. In variations, the network computing system 100 can determine that the actual processing time interval is likely to take longer than the predicted processing time interval. For example, the network computing system 100 can perform method 250 in response to one or more multiple service providers declining to accept an invitation for the service request of the requester.

In step 250, the network computing system 100 determines one or more actions to recommend for the requester. The actions can be recommended in order to improve a probability that the requester's service request can be matched to a service provider within a given time interval and/or otherwise reduce the processing time interval that would be required if no action is taken. In determining the actions, the network computing system 100 can, in step 252, determine the one or more recommended actions by evaluating service conditions that affect the service request. For example, the network computing system 100 can evaluate conditions such as the number of available service providers, the number of competing service requests, historical information that may be indicative of a desirability of the service request to service providers, and/or other information that may indicate a change to the processing time interval.

In some examples, the network computing system 100 can determines, in step 254, the recommended action to be a modification to a service parameter of the service request, in order for the service request to be more desirable to the available service providers. For example, the network computing system 100 can recommend that the service requester add a boost payment to increase the fare value for a service provider who accepts an invitation for the service request. As an addition or alternative, the network computing system 100 can recommend that the requester modify another service parameter of the service request, such as a service location (e.g., change pickup location to a more accessible location).

Still further, in variations, the network computing system 100 can determine, in step 256, the recommended action to be a modification that makes the service request available to additional service providers. In examples, the recommended action can specify a modification to the type of service originally requested with the service request. For example, the recommended action can suggest that the service requester upgrade or downgrade the service level being requested.

As still another variation, the network computing system 100 can determine, in step 256, the recommended action to be to allow for the network computing system to field the service request to service providers that collectively offer multiple different service types. In this latter case, the recommended action can be recommended in order to minimize the processing time interval for finding a match to the service request.

In step 260, the network computing system 100 can generate content that indicates the suggested action for the user. For example, the content configuration component 126 can transmit content data that identifies a modification to the original service request, a change to the type of service requested, and/or a change to request multiple service types at once. The content data 125 can be generated to be interactive, to enable the service requester to select whether he or she wishes to perform the recommended actions. Further, the content can provide information about the modified transport request, including a change to the fare value (e.g., based on the change to the service type), and/or a redetermination of the processing time interval (or update to the processing time interval).

In some examples, following step 260, the network computing system 100 can perform steps 220 and 230 of example method 200. For example, if the requester elects to modify the service request or change the type of service request, the method returns to step 220, where a predicted processing time interval is determined for the modified service request. Additionally, in step 230, content data can be transmitted to the service provider device to cause the service provider device to display content based on the updated or newly determined processing time interval.

While method 200B is described in context of the actual processing time interval exceeding the predicted processing time interval, steps 250, 252, 254, 256 and 260 (and the associated examples) can be implemented in other context. For example, steps 250, 252, 254, 256 and 260 can be performed while the predicted processing time interval is ongoing. For example, steps 250, 252, 254, 256 and 260 can be implemented upon a determination that the predicted processing time interval exceeds a threshold (e.g., ten minutes), or in response to one or more service providers declining to accept an invitation for the service request. Thus, in such examples, the content displayed during the processing time interval can include content that provides information about modifications to the service requester can make to his or her request, as well as information about the modified service request. For example, the information can identify a fare value, an updated service processing time interval for the modified transport request, and/or an estimated time of arrival for the service requester to arrive at a destination.

Example User Interfaces

Figures 3A, 3B:
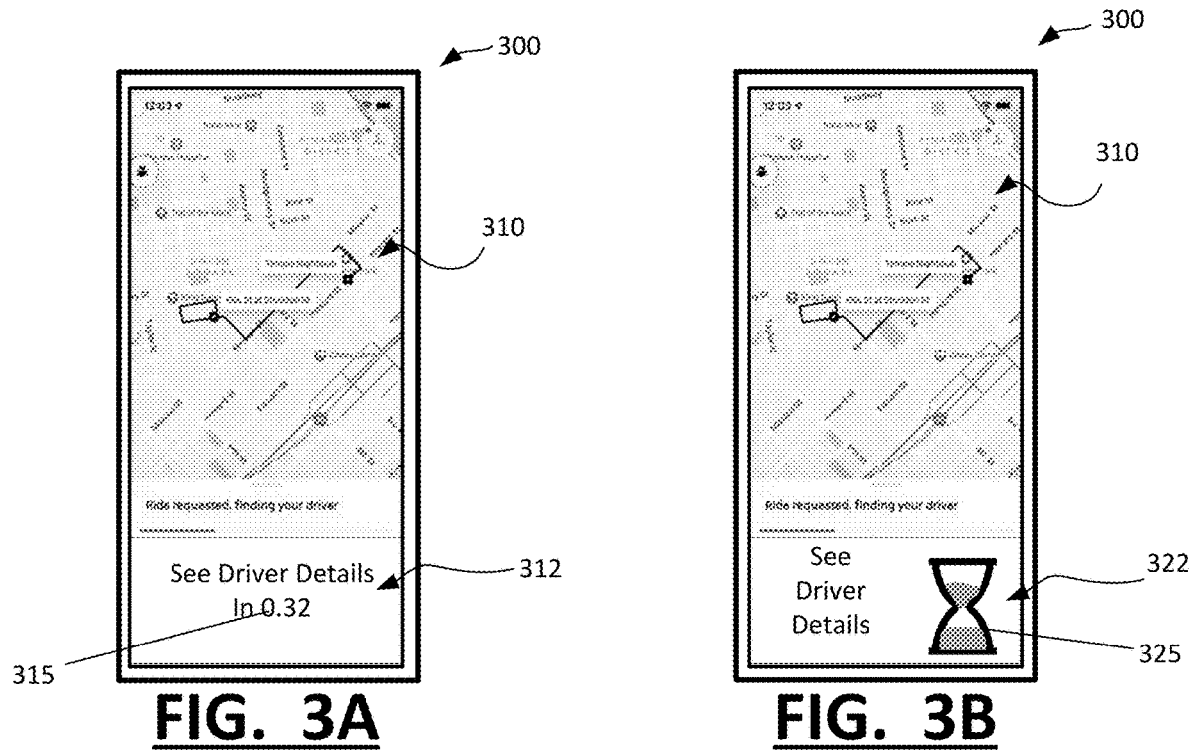
FIG. 3A through FIG. 3C illustrates example user interfaces for configuring a service request interface based on a processing time prediction, according to one or more embodiments.
Figure 3C:
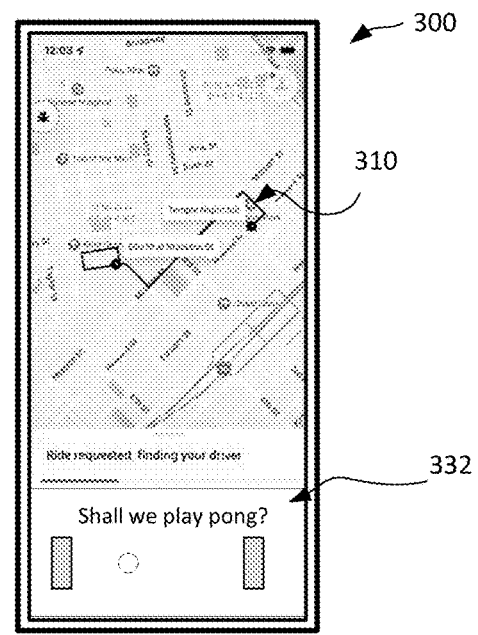

FIG. 3A through FIG. 3C illustrates example user interfaces for configuring a service request interface based on a processing time prediction, according to one or more embodiments. Accordingly, in describing examples of FIG. 3A through FIG. 3C, reference may be made to elements of FIG. 1 for purpose of illustrating suitable functionality for providing an example as described.

With reference to FIG. 3A through FIG. 3C, a requester computing device 300 displays a service request interface 310 that includes a content interface or feature. The content interface or feature can correspond to a user interface that is configured or otherwise based on a processing time prediction of the network computing system 100. The processing time prediction can include or correspond a predicted time-to-match interval, coinciding with a time interval extending from when the network computing system 100 receives a transport request transmitted from the requester computing device until a time when a selected service provider accepts an invitation to fulfill the service request. From a perspective of the requester, once the service request is transmitted, examples provide for the requester device 102 to immediately (e.g., with 1 second) display an intermediate content that includes, or is based on the predicted processing time interval.

In examples, the service request interface 310 can be based on content data 125 transmitted by the network computing system 100, where the content data 125 indicates or is based on the predicted processing time interval. The service request interface 310 can be provided in response to the user transmitting a service request. The service request interface 310 can include content that is based on the predicted processing time interval.

In an example of FIG. 3A, the service request interface 310 displays a content interface 312 that is indicative of the predicted processing interval. The content interface 312 can be in the form of an alphanumeric countdown timer 315 which begins a countdown on the computing device 300, starting with the predicted processing time interval. The content interface 312 can be dynamic, in that the countdown timer 315 can countdown in a manner that visualizes a time remaining until a service provider is matched to the service request of the user. Further, the content 312 can also be dynamic in that it can be updated by the network computing system 100, based on, for example, the progression of the processes that are implemented to match the requester to a service provider. For example, the countdown timer can adjusted if any one of the processes used to match the user's service request is faster/slower than predicted. Further, the countdown timer can be adjusted if an event occurs that is not accounted for in the determination of the predicted processing time interval. Examples of such events include one or more available service providers declining the service request.

In an example of FIG. 3B, the service request interface 310 displays a content interface 322 that includes a graphic representation 325 of a countdown time that initiates from a predicted processing interval. In the example shown, the content interface 322 includes a dynamic hourglass which visualizes the time remaining in the countdown. Numerous other graphic/animated features can be used to represent a countdown time. For example, the graphic/animated timers can be provided in the form of a falling object, where the distance of the object to the ground indicates a remainder of time remaining.

In an example of FIG. 3C, the service request interface 310 can include an engagement interface 332 or feature on which engagement content is provided. The engagement interface 332 can be configured with an objective to engage the user. In an example shown, the engagement interface 332 can be configured as an arcade game which the user my play for enjoyment. Alternatively, an engagement interface can display other types of games (e.g., trivia pursuit), puzzles (e.g., crossword puzzle, hangman, Soduku, etc.).

In examples, the network computing system 100 can transmit content data 125 to enable the requester computing device 300 to display any one of multiple possible content interfaces 312, 322, 332. The determination of which content interface to display can be based at least in part on the predicted processing time interval. For example, if the predicted processing time interval exceeds a threshold value, then an engagement interface 332 can be selected for the user. Still further, the type of engagement interface 322 that is displayed (e.g., type of game) can also be based on the predicted processing time interval. For example, the selection of which engagement interface 322 (e.g., which game or activity to engage the user with) to display can be based at least in part on the predicted processing time interval. The selection of the engagement interface 322 can match, for example, the expected duration a game or other form of interactive engagement is to last. On the other hand, if the predicted processing time interval is less than the threshold value, the selected user interface can provide a countdown timer. Still further, the interface can provide both a countdown timer and an engagement interface 322.

Hardware Diagram

Figure 4:
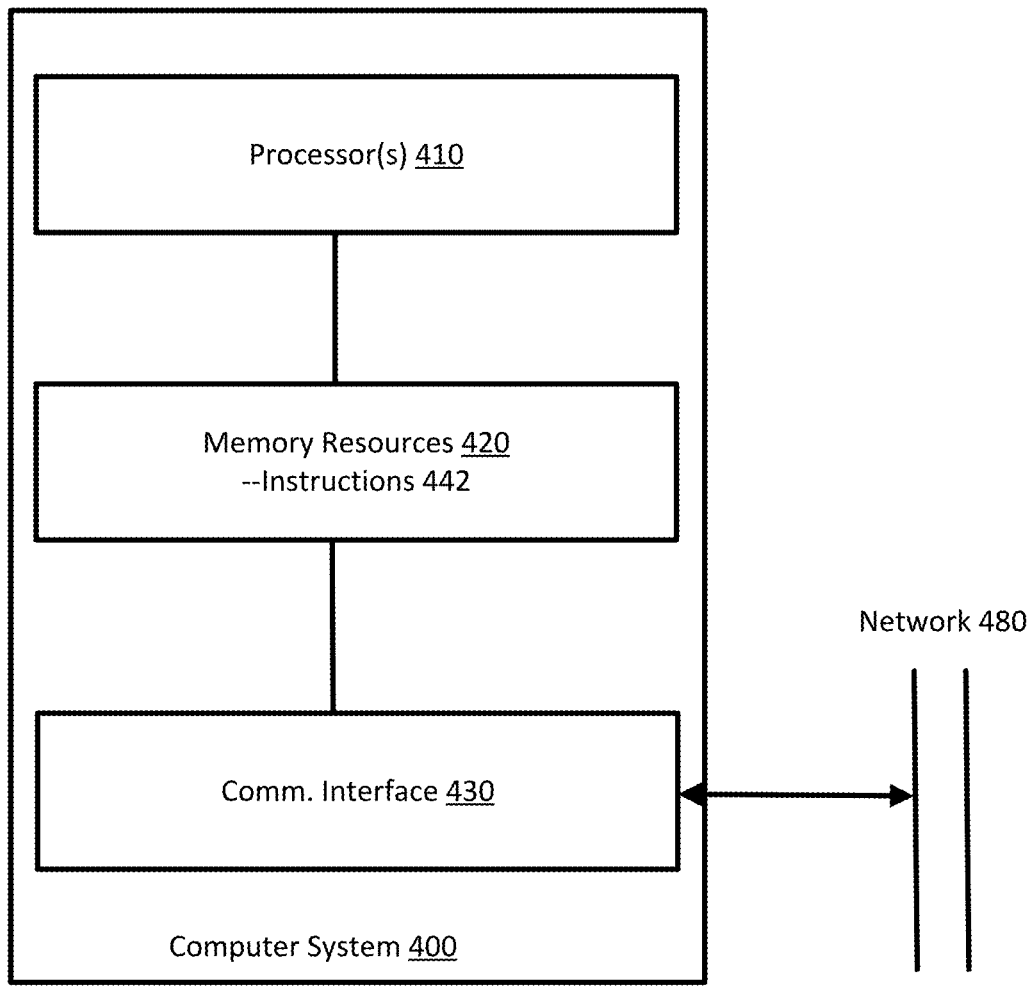
FIG. 4 is a block diagram that illustrates a computer system upon which one or more embodiments described herein can be implemented.

FIG. 4 is a block diagram that illustrates a computer system upon which one or more embodiments described herein can be implemented. A network system such as described with an example of FIG. 1 can be implemented using a computing system 400 of FIG. 4. Further, example methods 200A, 200B can be implemented using the computer system 400.

In one implementation, the computer system 400 includes one or more processors 410, memory resources 420, and a communication interface 430. The computer system 400 includes at least one processor 410 for processing information. The memory resources 420 may include a random access memory (RAM) or other dynamic storage device, for storing information and instructions to be executed by the processor(s) 410. The memory resources 420 also may be used for storing temporary variables or other intermediate information during execution of instructions to be executed by the processor(s) 410. The computer system 400 may also include other forms of memory resources, such as static storage devices for storing static information and instructions for the processor 410. The memory resources 420 can store information and instructions, including instructions 442 for predicting a processing time interval, and for transmitting content data to the requester devices 102.

The communication interface 430 can enable the computer system 400 to communicate with one or more networks 480 (e.g., cellular network) through use of the network link (wireless or wireline). Using the network link, the computer system 400 can communicate with one or more other computing devices and/or one or more other servers or data centers. In some variations, the computer system 400 can receive service requests from requester devices via the network link 480. Additionally, the computer system 400 can receive information from provider devices, from which forecasts of provisioning levels, location bias and other aspects described herein may be determined.

Examples described herein are related to the use of the computer system 400 for implementing the techniques described herein. According to one embodiment, those techniques are performed by the computer system 400 in response to the processor 410 executing one or more sequences of one or more instructions contained in the memory resource 420. Such instructions may be read into a main memory from another machine-readable medium, such as a storage device. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
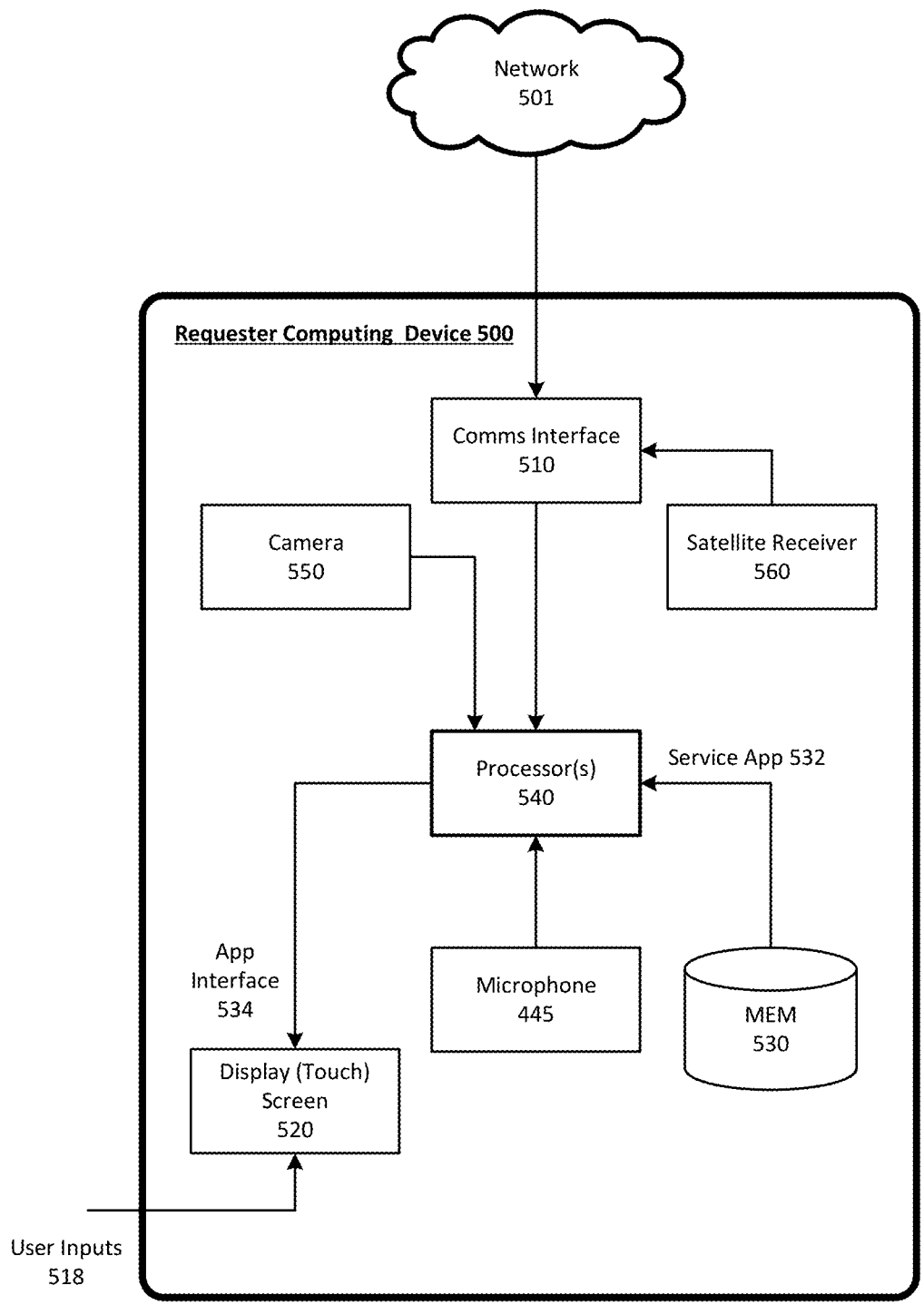
FIG. 5 illustrates a requester computing device on which one or more embodiments can be implemented.

FIG. 5 illustrates a requester computing device on which one or more embodiments can be implemented. In an example, the requester computing device corresponds to a user device 500, such as mobile device (e.g., tablet). The user device 500 can execute a service application 432 to transmit service requests to a network service such as provided by the network computing system 100 of FIG. 1. Additionally, the user device 500 can implement methods such as described with an example of FIG. 2. In many implementations, a requester computing device 500 can correspond to a mobile computing device having a touch-sensitive display or input surface, such as a tablet computer or computer that can be held in one or two hands. In variations, the computer device includes a laptop, VR or AR headset device, and the like.

The requester computing device 500 includes one or more processors 540 and memory resources 530. The memory resources 530 stores instructions that can correspond to the service application 532. The processor(s) 540 execute the instructions of the service application 532 to generate an application user interface 534, such as a service request interface. Additionally, the computing device 400 includes a microphone 545, a camera 550, a satellite receiver 560, and/or a wireless communication interface 510.

A touch-sensitive display screen 520 can receive user inputs 518 to interact or engage with user interfaces generated by the service application 532.

The microphone 545 can also be used in connection with a voice transcription tool which can translate voice utterances into inputs 518 that are processed through the service application 532. As an addition or variation, the service application 532 generates output as described with various examples. In some examples, the user can interact with the executing service application 532 by providing inputs 518 via, for example, the display screen 520, microphone 545 or other input mechanism. The inputs 518 can be used to specify attributes of a service request, which can be transmitted to the network computing system 100 over one or more networks 501. Additionally, the user inputs 518 can be received and processed subsequent to the transmission of the service request, such as to interact with a service application interface on which engagement content or other types of content are displayed.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
   one or more processors;
   a memory to store a set of instructions;
   wherein the one or more processors execute the set of instructions to perform operations that include:
   receiving, over one or more networks, a service request for a service from a requester device;
   for a geographic area and a time interval that are relevant to the service request, determining a number of service providers that are available to fulfill the service request and a number of service requests that are unmatched to service providers;
   based, at least in part, on the number of service providers that are available to fulfill the service request and the number of service requests that are unmatched to service providers for the geographic area and the time interval, predicting a processing time interval for the service request, the processing time interval extending from a time when the service request is received until a time a service provider that is selected by the network computer system accepts an invitation to provide the service;
   selecting a content interface from a plurality of content interfaces based on the predicted processing time interval, wherein the selected content interface from the plurality of content interfaces is selected based in part on whether the predicted processing time interval exceeds a threshold value; and
   transmitting content data corresponding to the selected content interface to the requester device, the content data causing the requester device to display the selected content interface.

2. The network computer system of claim 1, wherein the operations further comprise:
   initiating performance of a matching process to match the service request with one or more service providers; and
   wherein transmitting content data corresponding to the selected content interface includes causing the requester device to display dynamic content that is indicative of the predicted processing time interval while the matching process is being performed.

3. The network computer system of claim 2, wherein the transmitted content data corresponding to the selected content interface causes the requester device to display a countdown timer.

4. The network computer system of claim 3, wherein the countdown timer is provided in a graphic or dynamic form.

5. The network computer system of claim 1, wherein selecting the content interface includes selecting an engagement interface for a user of the requester device based on the predicted processing time interval.

6. The network computer system of claim 5, wherein selecting the engagement interface is selected based on a determination that the predicted processing time interval exceeds a threshold value.

7. The network computer system of claim 1, wherein the operations further comprise:
   determining a set of attributes for the service request; and
   wherein predicting the processing time interval is further based at least in part on the set of attributes of the service request.

8. The network computer system of claim 7, wherein the set of attributes include a destination of the service request.

9. The network computer system of claim 8, wherein the set of attributes includes at least one of an expected trip time or an expected trip distance for a service provider to complete the service request.

10. The network computer system of claim 1, wherein the operations further comprise:
    identifying one or more service providers that are available to fulfill the service request;
    for each of the one or more service providers, determining a probability value for the service provider to accept or decline the invitation; and
    wherein predicting the processing time interval is further based on the probability value determined for each of the one or more of the service providers.

11. The network computer system of claim 10, wherein the operations further comprise:
    accessing a data store to determine, for each service provider of the one or more service providers, an invitation response to one or more invitations to fulfill a corresponding service request in a prior time interval; and wherein for each of the one or more services providers, determining the probability value is based, at least in part, on the determined invitation response of the service provider to one or more invitations.

12. The network computing system of claim 1, wherein the operations further comprise:

detecting that an actual processing time interval for the service request exceeds the predicted processing time interval; and recommending one or more actions for a user of the requester device in response to detecting that the actual processing time exceeds the predicted processing time.

13. The network computer system of claim 12, wherein the one or more actions include a modification to one or more parameters of the service request.

14. The network computer system of claim 13, wherein the one or more parameters include a service type for the service request.

15. The network computer system of claim 12, wherein the operations include submitting the service request to multiple service providers offering multiple types of service.

16. A non-transitory computer-readable medium that stores instructions, which when executed by one or more processors of a network computer system, cause the network computer system to perform operations that include:

receiving, over one or more networks, a service request for a service from a requester device;

for a geographic area and a time interval that are relevant to the service request, determining a number of service providers that are available to fulfill the service request and a number of service requests that are unmatched to service providers;

based, at least in part, on the number of service providers that are available to fulfill the service request and the number of service requests that are unmatched to service providers for the geographic area and the time interval, predicting a processing time interval for the service request, the processing time interval extending from a time when the service request is received until a time a service provider that is selected by the network computer system accepts an invitation to provide the service;

selecting a content interface from a plurality of content interfaces based on the predicted processing time interval, wherein the selected content interface from the plurality of content interfaces is selected based in part on whether the predicted processing time interval exceeds a threshold value; and transmitting content data corresponding to the selected content interface to the requester device, the content data causing the requester device to display the selected content interface.

17. A computer-implemented method comprising:

receiving, over one or more networks, a service request for a service from a requester device;

for a geographic area and a time interval that are relevant to the service request, determining a number of service providers that are available to fulfill the service request and a number of service requests that are unmatched to service providers;

based, at least in part, on the number of service providers that are available to fulfill the service request and the number of service requests that are unmatched to service providers for the geographic area and the time interval, predicting a processing time interval for the service request, the processing time interval extending from a time when the service request is received until a time a service provider that is selected by a network computer system accepts an invitation to provide the service;

selecting a content interface from a plurality of content interfaces based on the predicted processing time interval, wherein the selected content interface from the plurality of content interfaces is selected based in part on whether the predicted processing time interval exceeds a threshold value; and transmitting content data corresponding to the selected content interface to the requester device, the content data causing the requester device to display the selected content interface.

18. The computer-implemented method of claim 17, further comprising:

initiating performance of a matching process to match the service request with one or more service providers; and wherein transmitting content data corresponding to the selected content interface includes causing the requester device to display dynamic content that is indicative of the predicted processing time interval while the matching process is being performed.

19. The computer-implemented method of claim 18, wherein the transmitted content data corresponding to the selected content interface causes the requester device to display a countdown timer.

20. The computer-implemented method of claim 19, wherein the countdown timer is provided in a graphic or dynamic form.

* * * * *